United States Patent
Han et al.

(10) Patent No.: US 11,094,921 B2
(45) Date of Patent: Aug. 17, 2021

(54) ELECTRODE FOR ELECTROCHEMICAL DEVICE AND METHOD FOR MANUFACTURING THE SAME

(71) Applicant: LG CHEM, LTD., Seoul (KR)

(72) Inventors: Song-Yi Han, Daejeon (KR); Ji-Eun Lee, Daejeon (KR); Song-Taek Oh, Daejeon (KR); Young-Geun Choi, Daejeon (KR)

(73) Assignee: LG Chem, Ltd.

( * ) Notice: Subject to any disclaimer, the term of this patent is extended or adjusted under 35 U.S.C. 154(b) by 210 days.

(21) Appl. No.: 16/094,056

(22) PCT Filed: Nov. 21, 2017

(86) PCT No.: PCT/KR2017/013299
§ 371 (c)(1),
(2) Date: Oct. 16, 2018

(87) PCT Pub. No.: WO2018/093240
PCT Pub. Date: May 24, 2018

(65) Prior Publication Data
US 2020/0212428 A1 Jul. 2, 2020

(30) Foreign Application Priority Data
Nov. 21, 2016 (KR) .................. 10-2016-0155217

(51) Int. Cl.
*H01M 4/04* (2006.01)
*H01M 4/02* (2006.01)
*H01M 4/139* (2010.01)

(52) U.S. Cl.
CPC ........... *H01M 4/139* (2013.01); *H01M 4/043* (2013.01); *H01M 4/0404* (2013.01); *H01M 4/0471* (2013.01); *H01M 2004/021* (2013.01)

(58) Field of Classification Search
CPC .... H01M 4/139; H01M 4/0404; H01M 4/043; H01M 4/0471; H01M 2004/021
See application file for complete search history.

(56) References Cited

U.S. PATENT DOCUMENTS 9,246,161 B2   1/2016   Ueno et al.
2006/0151318 A1   7/2006   Park et al.
(Continued)

FOREIGN PATENT DOCUMENTS

CN   102224620 A   10/2011
CN   103633289 A   3/2014
(Continued)

OTHER PUBLICATIONS

EPO machine generated English translation of CN-103746089-A (Year: 2014).*
(Continued)

*Primary Examiner* — Christopher P Domone
*Assistant Examiner* — Kimberly Wyluda
(74) *Attorney, Agent, or Firm* — Lerner, David, Littenberg, Krumholz & Mentlik, LLP

(57) ABSTRACT

The present disclosure relates to an electrode for an electrochemical device and a method for manufacturing the same. More particularly, the present disclosure relates to an electrode having a small difference in porosity along the thickness direction of the electrode, and a method for manufacturing the same.

6 Claims, 3 Drawing Sheets

(56) References Cited

U.S. PATENT DOCUMENTS

| | | |
|---|---|---|
| 2010/0062340 A1 | 3/2010 | Ide |
| 2011/0269020 A1 | 11/2011 | Kamiyama et al. |
| 2012/0328942 A1* | 12/2012 | Thomas-Alyea ..... H01M 4/587 429/211 |
| 2014/0287316 A1 | 9/2014 | Ahn et al. |
| 2014/0356717 A1* | 12/2014 | Gunji .................... H01M 4/523 429/221 |
| 2014/0370337 A1 | 12/2014 | Matsui et al. |
| 2017/0098822 A1 | 4/2017 | Yachi et al. |
| 2018/0097255 A1 | 4/2018 | Jung et al. |

FOREIGN PATENT DOCUMENTS

| | | | |
|---|---|---|---|
| CN | 103746089 A | * | 4/2014 |
| CN | 104241680 A | | 12/2014 |
| CN | 103474623 B | | 6/2016 |
| JP | 2001-216959 A | | 8/2001 |
| JP | 2011-9203 A | | 1/2011 |
| JP | 5413355 B2 | | 2/2014 |
| KR | 10-0682862 B1 | | 2/2007 |
| KR | 10-1189257 B1 | | 10/2012 |
| KR | 10/2014-0060800 A | | 5/2014 |
| KR | 10-2015-0029054 A | | 3/2015 |
| KR | 10-1560471 B1 | | 10/2015 |
| KR | 10-2016-0128834 A | | 11/2016 |
| WO | WO 2015/147234 A1 | | 10/2015 |
| WO | 2016175560 A1 | | 11/2016 |

OTHER PUBLICATIONS

EPO machine generated English translation of JP-2001216959-A (Year: 2001).*

International Search Report (PCT/ISA/210) issued in PCT/KR2017/013299, dated Feb. 19, 2018.

Chinese Search Report for Application No. 201780031197.7, dated Dec. 1, 2020, pp. 1-3.

* cited by examiner

ELECTRODE FOR ELECTROCHEMICAL DEVICE AND METHOD FOR MANUFACTURING THE SAME

TECHNICAL FIELD

The present application claims priority to Korean Patent Application No. 10-2016-0155217 filed on Nov. 21, 2016 in the Republic of Korea, the disclosures of which are incorporated herein by reference. The present disclosure relates to an electrode for an electrochemical device and a method for manufacturing the same. More particularly, the present disclosure relates to an electrode having a small difference in porosity along the thickness direction of the electrode, and a method for manufacturing the same.

BACKGROUND ART

An electrode for an electrochemical device, such as an electrode for a secondary battery, is obtained by preparing electrode slurry comprising an electrode active material, a conductive material and a binder, applying the slurry to a current collector and drying the slurry. Herein, a pressing process is carried out to pressurize active material powder against the current collector and to obtain a uniform thickness of the electrode. The pressing process is generally carried out by pressing the surface of the electrode with a pressurizing device. However, in this case, pressure cannot be transferred uniformly to the inner part of the electrode so that the electrode surface is pressurized more severely as compared to the inner part of the electrode, resulting in a decrease in porosity near the electrode surface. Such a phenomenon may become severe as the thickness or density of the electrode is increased. In addition, such decreased porosity of the electrode surface makes it difficult to impregnate the electrode with an electrolyte to the inner part of the electrode. Thus, it is not possible to ensure ion channels, thereby making it difficult to transport ions smoothly. This may result in degradation of the performance and life characteristics of a battery. Therefore, there is a need for developing an electrode having uniform porosity along the thickness direction of the electrode and a method for manufacturing the same.

DISCLOSURE

Technical Problem

The present disclosure is directed to providing an electrode having uniform porosity along the thickness direction of the electrode and a method for manufacturing the same. The present disclosure is also directed to providing an electrode which shows improved impregnation with an electrolyte and a method for manufacturing the same. It will be easily understood that the other objects and advantages of the present disclosure may be realized by the means shown in the appended claims and combinations thereof.

Technical Solution

In one aspect of the present disclosure, there is provided an electrode and a method for manufacturing the same to solve the above-mentioned technical problems.

According to an embodiment of the present disclosure, there is provided a method for manufacturing an electrode, including the steps of: (S10) preparing electrode slurry comprising an electrode active material, a binder and a conductive agent; (S20) applying the electrode slurry prepared from step (S10) to the surface of a current collector; (S30) drying the resultant product of step (S20) to remove the solvent totally or partially from the electrode slurry applied to the current collector, thereby forming a preliminary electrode layer; (S40) pressing the surface of the preliminary electrode layer; and (S50) removing a part of the surface of the pressed preliminary electrode layer.

According to a second embodiment of the present disclosure, there is provided the method for manufacturing an electrode of the first embodiment, wherein the electrode slurry of step (S20) is prepared from the two types of slurry including the first slurry and the second slurry, the first slurry includes electrode active material particles (particles A) and is applied to the surface of the electrode current collector, the second slurry includes electrode active material particles (particles B) and is applied to the surface of the applied first slurry, and the particle diameter ($D_{50}$) of particles B is smaller than the particle diameter ($D_{50}$) of particles A.

According to a third embodiment of the present disclosure, there is provided the method for manufacturing an electrode of the first embodiment, wherein the electrode slurry of step (S20) is prepared from the two types of slurry including the first slurry and the second slurry, the first slurry includes electrode active material particles (particles A) and is applied to the surface of the electrode current collector, the second slurry includes electrode active material particles (particles B) and is applied to the surface of the applied first slurry, particles B are primary particles, and particles A are secondary particles.

According to a fourth embodiment of the present disclosure, there is provided the method for manufacturing an electrode of any one of the first to the third embodiments, wherein step (S50) is carried out by removing 10%-30% of the thickness of the preliminary electrode layer obtained from step (S40) from the surface thereof.

According to a fifth embodiment of the present disclosure, there is provided the method for manufacturing an electrode of any one of the first to the fourth embodiments, wherein the electrode obtained from step (S50) shows an absolute value of a difference in porosity of 10% or less between the porosity (%) of the upper layer portion corresponding to 20% of the thickness from the surface of the electrode and the porosity (%) of the lower layer portion corresponding to 20% of the thickness from the surface of the current collector based on the thickness of the electrode layer.

According to a sixth embodiment of the present disclosure, there is provided the method for manufacturing an electrode of any one of the first to the fifth embodiments, wherein the electrode obtained from step (S50) has a porosity of 20%-70%.

According to a seventh embodiment of the present disclosure, there is provided an electrode for an electrochemical device, which shows an absolute value of a difference in porosity of 10% or less between the porosity (%) of the upper layer portion corresponding to 20% of the thickness from the surface of the electrode and the porosity (%) of the lower layer portion corresponding to 20% of the thickness from the surface of the current collector, based on the thickness of the electrode layer, and has a porosity of 20%-70%.

Advantageous Effects

The method for manufacturing an electrode according to the present disclosure provides an electrode having uniform porosity therein. Particularly, the method for manufacturing an electrode according to the present disclosure provides an electrode having an insignificant difference in porosity along the thickness direction of the electrode layer. In addition, the electrode obtained by the method for manufacturing an electrode according to the present disclosure shows uniform porosity from the surface of the electrode layer to the lower layer portion along the thickness direction thereof, and thus has excellent impregnation with an electrolyte.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
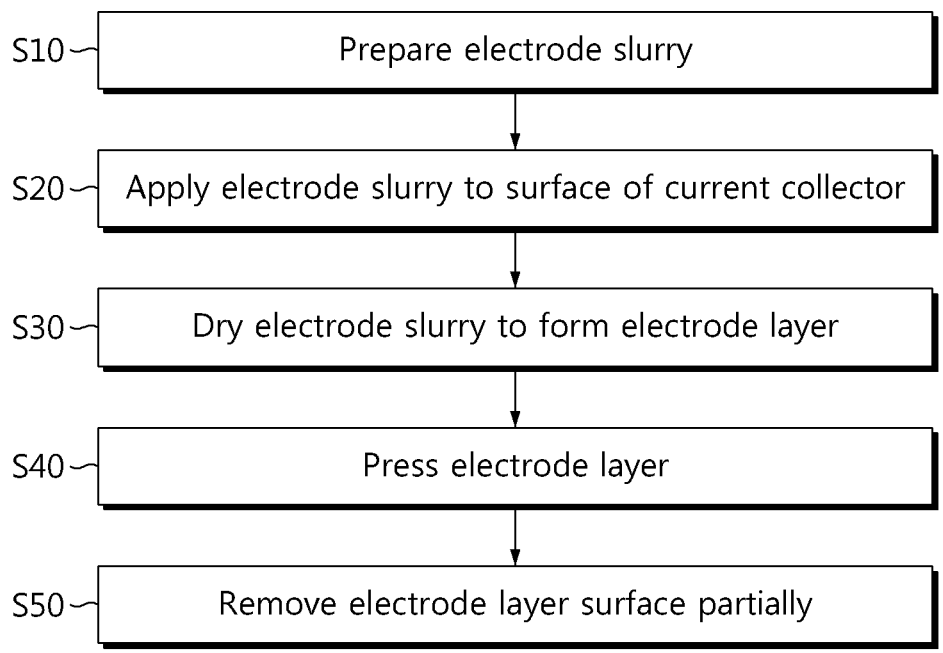
FIG. 1 is a flow chart illustrating each of the steps of the method for manufacturing an electrode according to the present disclosure in a time sequential manner.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌈includes⌋ an element' does not preclude the presence of any additional elements but means that the part may further include the other elements.

As used herein, the expression 'A and/or B' means 'A, B or both of them'. In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

Specific terms used in the following description are for illustrative purposes and are not limiting. Such terms as 'right', 'left', 'upper surface' and 'lower surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'upper' and 'lower' and related words and expressions show the positions and points in the drawings to which they are referred and should not be limiting. Such terms include the above-listed words, derivatives thereof and words having similar meanings.

Throughout the specification, the expression 'one member is disposed ⌈on⌋ the other member' covers the presence of the other member between the two members as well as the two members that are in contact with each other.

In one aspect, there is provided an electrode for an electrochemical device. The electrode according to the present disclosure includes an electrode layer disposed on the surface of a current collector and has uniform porosity distribution along the thickness direction of the electrode layer. According to the present disclosure, the electrode may be applied to a negative electrode, a positive electrode or both.

According to the present disclosure, the electrode includes a current collector and an electrode layer formed on at least one surface of the current collector. The electrode layer includes an electrode active material, a conductive material and a binder as a binding agent. According to the present disclosure, the electrode shows a difference in porosity of 20% or less as a relative ratio between the porosity (%) of the upper layer portion (also referred to as upper layer portion$_{50}$ hereinafter) corresponding to 50% of the thickness from the surface of the electrode layer and the porosity (%) of the lower layer portion (also referred to as lower layer portion$_{50}$ hereinafter) corresponding to 50% of the thickness from the surface of the current collector, based on the thickness of the electrode layer. Otherwise, the electrode shows an absolute value of a difference in porosity of 10% or less between the porosity (%) of the upper layer portion (also referred to as upper layer portion$_{20}$ hereinafter) corresponding to 20% of the thickness from the surface of the electrode layer and the porosity (%) of the lower layer portion (also referred to as lower layer portion$_{20}$ hereinafter) corresponding to 20% of the thickness from the surface of the current collector, based on the thickness of the electrode layer. In addition, according to the present disclosure, the electrode layer has a porosity of 20%-70%, or 15%-45%. According to the present disclosure, the porosity may be determined by a conventional method using a Hg porosimeter or pycnometer.

According to the present disclosure, the electrochemical device includes any devices carrying out electrochemical reactions and particular examples thereof include all kinds of primary batteries, secondary batteries, fuel cells, solar cells or capacitors, such as super-capacitor devices. Particularly, the secondary batteries preferably include lithium secondary batteries, such as lithium metal secondary batteries, lithium ion secondary batteries, lithium polymer secondary batteries, lithium ion polymer secondary batteries, or the like.

The electrode according to the present disclosure has high porosity on the electrode layer surface and thus allows easy impregnation with an electrolyte even to the inner part of the electrode active material layer. In addition, the electrode layer has pores formed on the whole of the electrode layer body with uniform distribution to facilitate ion transport, thereby providing an effect of improving the performance and life characteristics of a battery.

In still another aspect, there is provided a method for manufacturing an electrode having the above-described characteristics. FIG. 1 is a flow chart illustrating each of the steps of the method for manufacturing an electrode according to the present disclosure. Hereinafter, the method for manufacturing an electrode according to the present disclosure will be explained in detail with reference to FIG. 1.

First, slurry for forming an electrode layer is prepared (S10). The slurry 11p includes an electrode active material, a binder and a conductive material and is prepared by introducing and dispersing the above-mentioned ingredients to a suitable solvent.

When the electrode is a positive electrode (i.e. cathode), the positive electrode active material may include, but is not limited to: a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+x}Mn_{2-x}O_4$ (wherein x is 0-0.33), $LiMnO_3$, $LiMn_2O_3$ or $LiMnO_2$; a lithium copper oxide ($Li_2CuO_2$); a vanadium oxide such as $LiV_3O_8$, $LiFe_3O_4$, $V_2O_5$ or $Cu_2V_2O_7$; a Ni-site type lithium nickel oxide represented by the chemical formula of $LiNi_{1-x}M_xO_2$ (wherein M is Co, Mn, Al, Cu, Fe, Mg, B or Ga, and x is 0.01-0.3); a lithium manganese composite oxide represented by the chemical formula of $LiMn_{2-x}M_xO_2$ (wherein M=Co, Ni, Fe, Cr, Zn or Ta, and x is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$, or the like.

Meanwhile, when the electrode is a negative electrode (i.e. anode), the negative electrode active material may include: carbon such as non-graphitizable carbon, graphitic carbon, or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0 < x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_3$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials, or the like.

The binder functions to attach the electrode active material particles to each other and to attach the positive electrode active material to a current collector. Typical examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-containing polymers, polyvinyl pyrrolidone, polyurethane, polytetrafluoroethylene, polyvinylidene fluoride, polyethylene, polypropylene, styrene butyrene rubber, acrylated styrene-butadiene rubber, epoxy resins, nylon, or the like, but are not limited thereto.

The conductive material is an ingredient causing no chemical change in the battery. Particular examples of the conductive material include: graphite such as natural graphite, artificial graphite, or the like; carbon black such as carbon black, acetylene black, Ketjen black (Trade name), carbon nanotubes, carbon nanofibers, channel black, furnace black, lamp black, thermal black, or the like; conductive fibers such as carbon fibers, metallic fibers, or the like; metal powder such as fluorocarbon, aluminum, nickel powder, or the like; conductive whiskers such as zinc oxide, potassium titanate, or the like; conductive metal oxides such as titanium dioxide; conductive materials such as polyphenylene; or the like.

According to an embodiment of the present disclosure, the slurry for forming the electrode layer may be prepared from two types of the first slurry and the second slurry. The first slurry is applied to the surface of the current collector to form the lower portion ($11_L$, $110_L$) of the preliminary electrode layer, while the second electrode slurry is applied to the surface of the applied first slurry to form the upper portion ($11_U$, $110_U$) of the preliminary electrode layer. In other words, the whole or a part of the upper portion of the preliminary electrode layer formed from the second slurry corresponding to a predetermined thickness from the surface thereof is removed in the step described hereinafter. The lower portion of the preliminary electrode layer formed from the first slurry remains as it is to form the electrode layer finally.

As described hereinafter, a pressing process is carried out after drying the slurry. The pressure applied herein is not distributed uniformly along the thickness direction of the electrode layer but tends to be concentrated at the portion adjacent to the surface of the object (electrode) to be pressurized. As a result, after pressing, the electrode layer tends to have increased density on the surface thereof. Therefore, according to the present disclosure, the surface portion is allowed to function as a pressure barrier against the lower part of the electrode by making the pressure more concentrated on the surface portion during the pressing. Thus, a portion of the electrode which is not removed after etching but remains as it is can have a desired degree of porosity and the electrode can provide uniform porosity distribution along the thickness direction of the electrode layer.

For this purpose, according to an embodiment of the present disclosure, the active material particles (particles A) comprised in the first slurry have higher pressing density as compared to the active material particles (particles B) comprised in the second slurry. When pressure is applied during the pressing process, a dense and compact structure of particles is formed first in the surface portion comprising particles B having lower pressing density as compared to particles A, and thus the surface portion has high density. Therefore, it is possible to release and/or reduce the pressure applied to the surface portion comprising particles B, and thus to improve the porosity of the electrode layer.

According to an embodiment of the present disclosure, when manufacturing a positive electrode, lithium cobalt oxide (LCO), such as $LiCoO_2$, may be used as particles B. LCO has a simple structure and facilitates increasing density during the pressing. However, in the case of secondary particles formed by aggregation of primary particles, they tend to restore their original state even after the pressing. Therefore, it is preferred that the first slurry includes secondary particles as an active material and the second slurry includes primary particles as an active material.

Meanwhile, the pressing density may be determined by using a powder resistance measuring system MCP-PD51 available from Mitsubishi Chemical. In the case of the powder resistance measuring system, a predetermined amount of active material powder is introduced to a cylinder-type load cell and force is applied continuously thereto. Then, pressing density is determined by the density measured during the pressurization of the particles.

According to an embodiment of the present disclosure, the sphericity value of particles B is larger than that of particles A. According to a particular embodiment, the sphericity value of particles A may be limited to a range of 1-3.5, wherein the sphericity value of particles B may be larger than that of particles A. By placing elliptical particles on the upper portion, they may function as a pressure barrier for the layer mainly including elliptical particles. Thus, it is possible to prevent the lower portion (the layer mainly including spherical particles) from being pressurized excessively.

According to an embodiment of the present disclosure, primary particles may be used as particles B and secondary particles may be used particles A. In addition, it is preferred that particles B have a smaller particle diameter ($D_{50}$) as compared to particles A. When particles B are primary particles and have a smaller particle diameter as compared to particles A, it is possible to provide an effect of releasing and/or reducing the pressure applied to the surface portion as described above, and thus to improve the porosity of the resultant electrode. According to the present disclosure, the particle diameter ($D_{50}$) can be defined as particle diameter of 50% of the integrated value from a smaller particle diameter calculated based on the results of measurement of particle size distribution of the particles after the classification thereof using a particle size distribution measuring system. For example, the particle diameter ($D_{50}$) may be determined by using a laser diffraction method.

According to the present disclosure, the term 'secondary particles' means a particle shape like a bunch of grapes formed by aggregation of a plurality of primary particles.

According to an embodiment of the present disclosure, particles A may have higher particle strength as compared to particles B. According to a preferred embodiment of the present disclosure, the ratio of particle strength of particles B and particles A may be 1:9-4.9:5.1, In the case of natural graphite, it has a particle strength of 5-20 MPa. In the case of artificial graphite or reinforced natural graphite, it has a particle strength of 20-150 MPa. Therefore, the process according to the present disclosure may be applied by using artificial graphite or reinforced natural graphite as particles A and natural graphite as particles B.

As mentioned above, the active material having lower particle strength is disposed on the surface portion of the electrode, and thus the pressure to be applied during the pressing may be further concentrated toward the upper portion to be removed by the subsequent process. In this manner, the lower portion of the electrode layer is not pressurized excessively and the finally formed electrode layer shows uniform pore distribution over the total thickness thereof.

Meanwhile, the term 'particle strength' used herein means the force determined when particles are broken after they are applied in the form of a single layer and then a predetermined pressure is applied thereto through a microindenter from the upper portion thereof As used herein, the term 'mainly' means at least 50% of the total weight and the sphericity (R) can be defined as L/S, wherein L means the longer diameter of particles and S means the shorter diameter of particles. In other words, sphericity value may be defined as the ratio of the longer diameter/shorter diameter of particles. As the sphericity value approaches 1, the difference between the longer diameter of particles and the shorter diameter of particles is decreased and the particles may have a shape close to a spherical shape.

According to an embodiment of the present disclosure, the electrode active material may show a bimodal particle diameter distribution with a view to control of porosity and improvement of uniformity in terms of pore size and distribution. In addition, the slurry may include a dispersant in an amount of 0.1-1 wt % based on 100 wt % of the slurry in order to increase the dispersability of particles. Particularly, according to the present disclosure, the bimodal distribution may be applied to the lower portion of the preliminary electrode layer, preferably. Therefore, electrode active material particles A comprised in the first slurry may show such a distribution. Herein, electrode active material particles B comprised in the second slurry may show monomodal distribution. Preferably, the particle diameter ($D_{50}$) of electrode active material particles B is smaller than the particle diameter of particles having a larger particle diameter among particles A having bimodal distribution. According to an embodiment of the present disclosure, particles B may have a smaller particle diameter as compared to the particles having a smaller particle diameter among particles A.

Figure 2A:
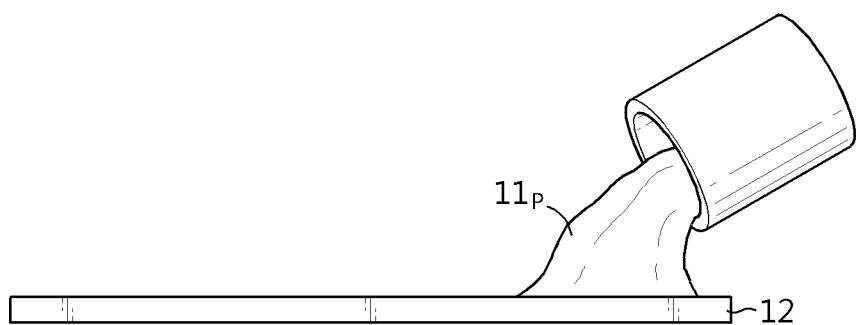
FIG. 2a to FIG. 2e are schematic views illustrating the method for manufacturing an electrode according to the present disclosure and an electrode obtained by the method.

Then, the slurry is applied to the surface of the current collector 12 (S20, see FIG. 2a).

As described above, when the slurry is prepared from the two types of the first slurry and the second slurry, the first slurry is applied to the surface of the current collector 12, and then the second slurry is applied. Application of the second slurry may be carried out before or after the first slurry is dried. According to an embodiment of the present disclosure, the first slurry and the second slurry may be applied at the same time by using a multi-slot die having a plurality of ejection ports. The current collector is not particularly limited, as long as it has conductivity while not causing any chemical change in the battery. The current collector that may be used includes stainless steel, aluminum, nickel, titanium, baked carbon, copper or stainless steel surface-treated with carbon, nickel, titanium, silver, etc., aluminum-cadmium alloy, or the like.

The slurry may be applied by using a doctor blade or slot die. However, application of the slurry is not limited thereto, and any suitable method may be used as long as it allows application of the electrode slurry to the surface of a current collector with uniform thickness.

Figure 2B:
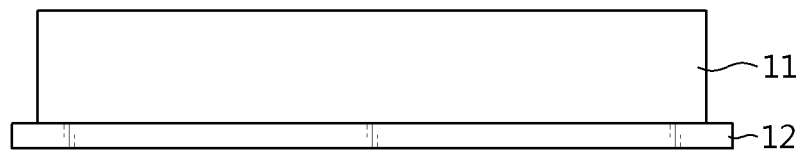

Then, the slurry is dried to form a preliminary electrode layer (S30). Through the drying process of this step, the solvent is removed totally or partially from the slurry. According to an embodiment of the present disclosure, when the first slurry and the second slurry are applied in a wet-on-wet manner, the first slurry and the second slurry may be dried at the same time during this step. When the second slurry is applied after the first slurry is dried, the second slurry is dried during this step. The drying may be carried out under heating to accelerate the removal of the solvent. The drying process is not particularly limited, and any suitable process selected from air blow drying, cold air drying, heat drying and hot air drying may be used (see FIG. 2b).

Then, the dried preliminary electrode layer is subjected to a pressing process (S40).

Figure 2C:
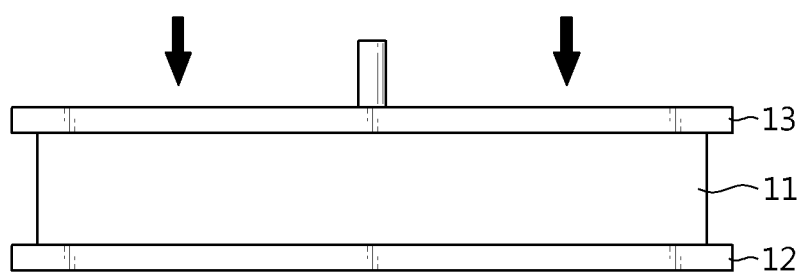

The pressing is carried out in order to obtain uniform thickness of the electrode layer and to increase the binding force among electrode active material particles and between the electrode layer and the current collector. According to the present disclosure, the pressing may be carried out by cold pressing or hot pressing, hot pressing being preferred. Hot pressing is preferably carried out under such a condition that the temperature of the binder comprised in the electrode layer is increased to a temperature of its glass transition temperature or higher. FIG. 2c is a schematic view illustrating an embodiment of the present disclosure. Referring to FIG. 2c, the pressing process may be carried out by using a pressing member 13 such as a jug or pressing roll.

As described above, the pressing process is carried out by pressurizing the surface of the preliminary electrode layer by using a pressing member. Herein, the pressure applied during the pressing process tends to be concentrated on the surface of the preliminary electrode layer and is not transferred uniformly to the inner part of the electrode. Therefore, the preliminary electrode layer subjected to the pressing process has significantly lower porosity on the vicinity of the electrode surface as compared to the porosity of the inner part of the electrode. In addition, as described above, when the primary particles or particles having low pressing density or compression strength are disposed mainly on the surface of the electrode layer, the upper portion of the preliminary electrode layer has a further reinforced pressure barrier function to prevent application of excessively high pressure to the lower portion of the preliminary electrode layer. Thus, the finally formed electrode layer maintains porosity adequately.

Figure 2D:
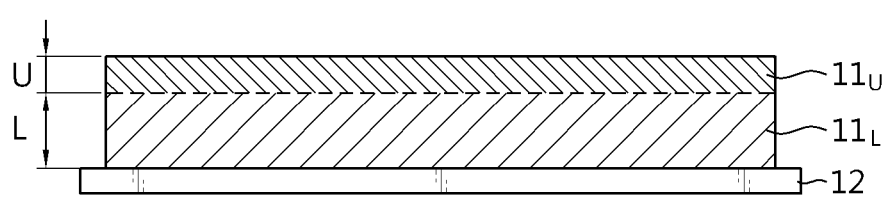
Figure 2E:
Figure 2E:
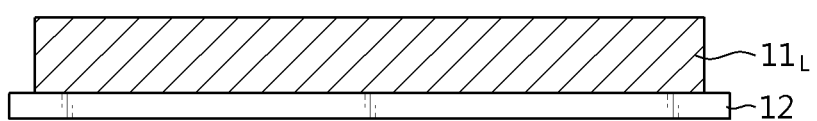

Then, the upper portion of the preliminary electrode layer subjected to the pressing process is removed (S50). A portion (upper portion of preliminary electrode layer, $11_U$) corresponding to a predetermined thickness from the surface of the preliminary electrode layer subjected to the pressing process in the total thickness thereof is removed (see FIG. 2d and FIG. 2e). According to an embodiment of the present disclosure, 10%-30% of the thickness is removed from the surface of the preliminary electrode layer. When the preliminary electrode layer is formed from the heterogeneous slurry of the first slurry and the second slurry, the upper portion of the preliminary electrode layer may be a portion formed from the second slurry. As described above, the surface of the preliminary electrode layer after pressing has lower porosity as compared to the inner part of the electrode. Therefore, it is possible to increase the overall porosity of the electrode layer by removing the surface portion having lower porosity after the pressing process. In this manner, the porosity of the electrode layer surface is improved to allow improved impregnation with an electrolyte. In addition, pores are distributed uniformly throughout the whole body of the electrode layer, thereby providing an effect of improving ion conductivity.

According to an embodiment of the present disclosure, the method for removing the electrode surface portion (upper portion of the preliminary electrode layer) may include physical cutting, laser etching, use of a wearing tester, SAICAS or an inclined cutter, or the like. However, the present disclosure is not limited thereto.

In another aspect, there is provided an electrode assembly including the electrode having the above-mentioned characteristics, and an electrochemical device including the electrode assembly. According to an embodiment of the present disclosure, the electrode assembly includes a positive electrode, a negative electrode and a separator interposed between the positive electrode and the negative electrode, wherein at least one of the positive electrode and the negative electrode may include the electrode according to the present disclosure.

According to an embodiment of the present disclosure, the separator is interposed between the positive electrode and the negative electrode and includes an insulating thin film having high ion permeability and mechanical strength. In general, the separator has a pore diameter of 0.01-10 μm and a thickness of 5-300 μm. Particular examples of the separator include: olefin polymers, such as polypropylene having chemical resistance and hydrophobic property; sheets or non-woven webs made of glass fibers or polyethylene, etc.; or the like. In addition, the separator may be further provided with an inorganic coating layer comprising inorganic particles and a binder, on at least one surface thereof, in order to improve the heat resistance of the separator and to prevent a short circuit between the positive electrode and the negative electrode.

In addition, the electrolyte includes an organic solvent and a predetermined amount of lithium salt. Particular examples of the organic solvent include at least one selected from propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), γ-butryolactone (GBL), fluoroethylene carbonate, methyl formate, ethyl formate, propyl formate, methyl acetate, ethyl acetate, propyl acetate, pentyl acetate, methyl propionate, ethyl propionate, propyl propionate, butyl propionate, or a combination thereof, and halogen derives of the organic solvents and linear esters may be used. The lithium salt is a material that can be dissolved easily in the non-aqueous electrolyte. Particular examples of the lithium salt include LiCl, LiBr, LiI, $LiClO_4$, $LiBF_4$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2$ NLi, lithium chloroborate, lower aliphatic lithium carboxylate, lithium tetraphenylborate, imide, or the like.

In addition, elements other than the above-described battery elements may be used, as long as they are used conventionally in the field of batteries, particularly in the field of lithium secondary batteries.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Preparation Example 1 (Comparative Example 1)

Figure 3:
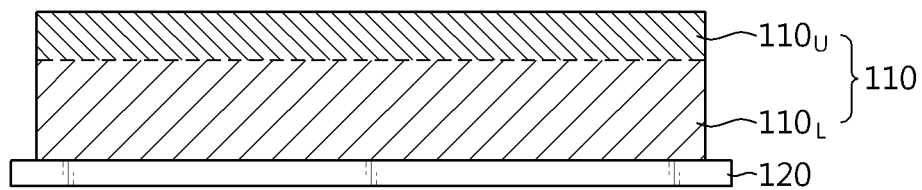
FIG. 3 is a schematic view illustrating the porosity distribution of the electrode according to Comparative Example 1.

First, 96 wt % of artificial graphite as a negative electrode active material, 1 wt % of Denka black (conductive material), 2 wt % of SBR and 1 wt % of CMC were mixed to form negative electrode slurry. The resultant negative electrode slurry was coated onto one surface of a copper current collector to a thickness of 141 μm and dried with hot air at 80° C. The dried electrode was pressed to a thickness of 117 μm by using a roll press. The resultant electrode is shown schematically in FIG. 3. The electrode layer had a thickness of 117 μm and the electrode active material was loaded in an amount of 5.4 mAh/cm². In the electrode, the 10% upper layer portion $110_U$ had a porosity of 14.5%, the 90% lower layer portion $110_L$ (10% from the lower surface) had a porosity of 31.7%, and the electrode had an overall porosity of 30%.

Preparation Example 2 (Comparative Example 2)

Figure 4:
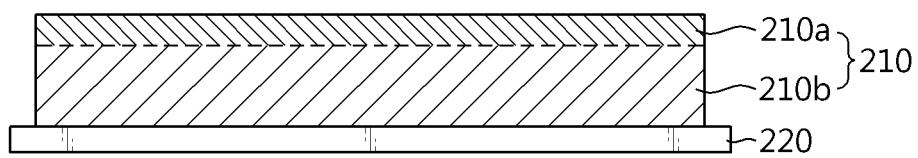
FIG. 4 is a schematic view illustrating the porosity distribution of the electrode according to Comparative Example 2.

First, 96 wt % of artificial graphite as a negative electrode active material, 1 wt % of Denka black (conductive material), 2 wt % of SBR and 1 wt % of CMC were mixed to form negative electrode slurry. The resultant negative electrode slurry was coated onto one surface of a copper current collector to a thickness of 128 μm and dried with hot air at 80° C. The dried electrode was pressed to a thickness of 110 μm by using a roll press. The resultant electrode is shown schematically in FIG. 4. The electrode layer had a thickness of 110 μm and the electrode active material was loaded in an amount of 4.88 mAh/cm². In the electrode, the 10% upper layer portion $110_U$ had a porosity of 15%, the 90% lower layer portion $110_L$ (10% from the lower surface) had a porosity of 32%, and the electrode had an overall porosity of 30%.

Preparation Example 3 (Comparative Example 3)

First, 96 wt % of particles A ($LiNi_{0.6}Mn_{0.2}Co_{0.2}O_2$, $D_{50}$ 13 μm), 1 wt % of Denka black (conductive material) and 3 wt % of PVDF were mixed to form negative electrode slurry.

The first slurry was coated onto one surface of an aluminum current collector to a thickness of 125 μm and dried with hot air at 80° C. The dried electrode was pressed to a thickness of 111 μm by using a roll press. The electrode layer had a thickness of 111 μm and the electrode active material was loaded in an amount of 5 mAh/cm². In the electrode, the 10% upper layer portion had a porosity of 18%, the 90% lower layer portion (10% from the lower surface) had a porosity of 29%, and the electrode had an overall porosity of 28%.

Preparation Example 4 (Example 1)

Figure 5:
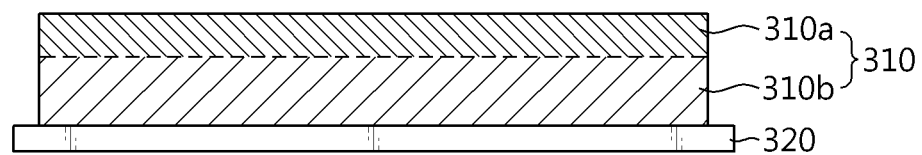
FIG. 5 is a schematic view illustrating the porosity distribution of the electrode according to Example.

First, 96 wt % of artificial graphite as a negative electrode active material, 1 wt % of Denka black (conductive material), 2 wt % of SBR and 1 wt % of CMC were mixed to form negative electrode slurry. The resultant negative electrode slurry was coated onto one surface of a copper current collector to a thickness of 141 μm and dried with hot air at 80° C. The dried electrode was pressed to a thickness of 114 μm by using a roll press. Then, the 10% upper layer portion based on the thickness of the electrode layer was removed by using a wear tester. The resultant electrode is shown schematically in FIG. 5. The electrode layer had a thickness of 106 μm and the electrode active material was loaded in an amount of 4.88 mAh/cm². In the electrode, the 10% upper layer portion had a porosity of 28.5%, the 90% lower layer portion (10% from the lower surface) had a porosity of 30.5%, and the electrode had an overall porosity of 30%.

Preparation Example 5 (Example 2)

1) Preparation of First Slurry 96 wt % of particles A (($LiNi_{0.6}Mn_{0.2}Co_{0.2}O_2$, $D_{50}$ 13 μm), 1 wt % of Denka black (conductive material) and 3 wt % of PVDF were mixed to form slurry.

2) Preparation of Second Slurry 96 wt % of particles A (($LiNi_{0.6}Mn_{0.2}Co_{0.2}O_2$, $D_{50}$ 4 μm), 1 wt % of Denka black (conductive material) and 3 wt % of PVDF were mixed to form slurry.

3) Manufacture of Electrode

The first slurry and the second slurry were coated onto one surface of an aluminum current collector to a thickness of 100 μm and 40 μm, respectively, and dried with hot air at 80° C. The dried electrode was pressed to a thickness of 114 μm by using a roll press. In the resultant preliminary electrode layer, the upper portion portion formed from the second slurry had a porosity of 18%. Then, the first slurry portion was removed by using a wear tester. The electrode layer had a thickness of 106 μm and the electrode active material was loaded in an amount of 5 mAh/cm². In the electrode, the 10% upper layer portion had a porosity of 27.5%, the 90% lower layer portion (10% from the lower surface) had a porosity of 28.5%, and the electrode had an overall porosity of 28.5%.

Among Preparation Examples 1-5, Preparation Examples 4 and 5 are electrodes according to the present disclosure and correspond to Examples 1 and 2, respectively. In addition, Preparation Examples 1, 2 and 3 are designated as Comparative Examples 1, 2 and 3.

Each of the electrodes (Preparation Examples 4 and 5) obtained by the method according to the present disclosure have a difference in porosity of 10% or less between the upper layer portion and the lower layer portion, and show uniform porosity from the electrode surface layer portion to the inner part of the body and the vicinity of the current collector. On the contrary, each of the batteries according to Preparation Examples 1-3 has a significant difference in porosity between the surface layer portion and the lower layer portion and shows significantly low porosity at the surface layer portion.

Determination of Battery Characteristics

Each of the electrodes according to Example 1 and Comparative Examples 1 and 2 was used as a negative electrode to provide a coin cell. A separator (separator made of polyethylene, thickness: 20 μm) was interposed between the negative electrode and the positive electrode to obtain an electrode assembly, and an electrolyte including an organic solvent (1,3-dioxolane:dimethoxyethane=1:1 volume ratio) containing IM of LiTFSI and 1 wt % of $LiNO_3$ was used as an electrolyte to obtain a coin cell. The positive electrode used $LiNi_{0.5}Mn_{0.3}Co_{0.2}O_2$ as a positive electrode active material.

Charging/discharging was carried out under the condition of a C-rate of 1.6 C at a temperature of 25° C. The charging depth means the state-of-charge (SOC) before lithium plating occurs at the negative electrode. In general, lithium plating occurs when the negative voltage has a potential of 0V or less. Thus, in this test, 0.05V is taken as reference for determination of charging depth.

Figure 6:
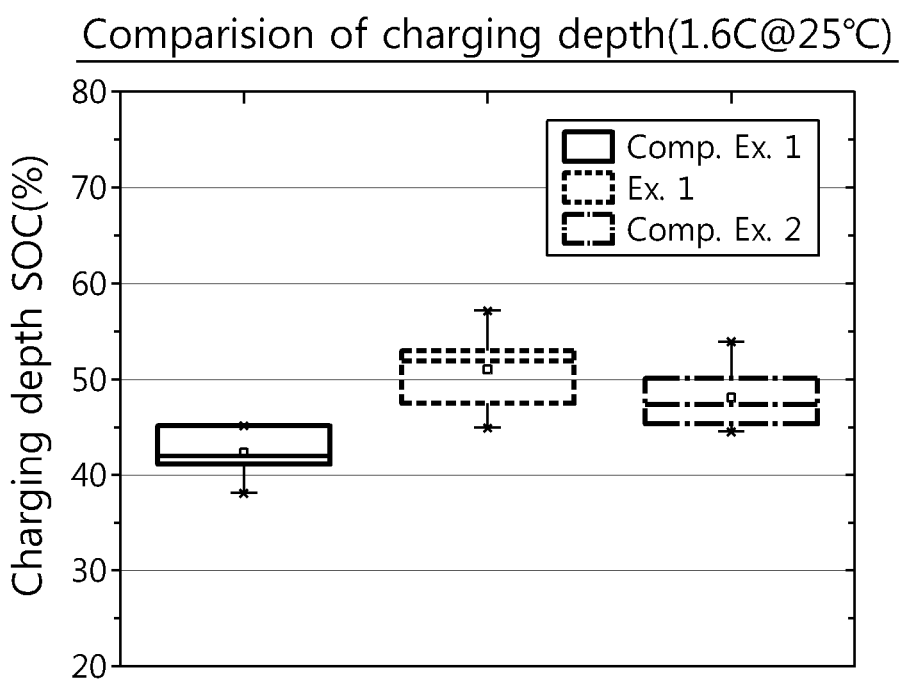
FIG. 6 is a graph illustrating the charging depth of each of the coin cells obtained by using the electrodes according to Example 1 and Comparative Examples 1 and 2.

FIG. 6 is a graph illustrating the charging depth of each battery. In the case of Example 1, the battery show a high charging depth, which suggests that the electrode according to Example 1 has an improved pore structure as compared to the electrodes according to Comparative Examples 1 and 2.

As can be seen from the foregoing, the method according to the present disclosure can provide an electrode having uniform porosity throughout the whole electrode body by a simple process.

DESCRIPTION OF DRAWING NUMERALS

12: Current collector
11p: Electrode slurry
11: Dried preliminary electrode layer
13: Pressing member
$11_U$, $110_U$: Upper portion of preliminary electrode layer
$11_L$, $110_L$: Lower portion of preliminary electrode layer
210, 310: Electrode layer
210a, 310a: Upper layer portion of electrode
210b, 310b: Lower layer portion of electrode

What is claimed is:

1. A method for manufacturing an electrode for an electrochemical device, comprising the steps of:
   (S10) preparing an electrode slurry comprising an electrode active material, a binder a conductive agent, and a solvent;
   (S20) applying the electrode slurry prepared from step (S10) to a surface of a current collector;
   (S30) drying the resultant product of step (S20) to remove the solvent totally or partially from the electrode slurry applied to the current collector, thereby forming a preliminary electrode layer;

(S40) pressing the surface of the preliminary electrode layer; and (S50) removing a part of a surface of the pressed preliminary electrode layer to form the electrode, wherein the electrode slurry of step (S20) is prepared from two types of slurry comprising a first slurry and a second slurry, the first slurry comprises first electrode active material particles (particles A), a binder, a conductive agent, and a solvent, and is applied to the surface of the electrode current collector, the second slurry comprises second electrode active material particles (particles B), a binder, a conductive agent, and a solvent and is applied to a surface of the applied first slurry, and a particle diameter ($D_{50}$) of particles B is smaller than a particle diameter ($D_{50}$) of particles A.

2. The method for manufacturing an electrode for an electrochemical device according to claim 1, wherein the electrode slurry of step (S20) is prepared from two types of slurry comprising a first slurry and a second slurry, the first slurry comprises first electrode active material particles (particles A), a binder, a conductive agent, and a solvent and is applied to the surface of the electrode current collector, the second slurry comprises electrode active material particles (particles B), a binder, a conductive agent, and a solvent and is applied to a surface of the applied first slurry, particles B are primary particles, and particles A are secondary particles.

3. The method for manufacturing an electrode for an electrochemical device according to claim 1, wherein step (S50) is carried out by removing 10%-30% of the thickness of the preliminary electrode layer obtained from step (S40) from the surface thereof.

4. The method for manufacturing an electrode for an electrochemical device according to claim 1, wherein the electrode obtained from step (S50) shows an absolute value of a difference in porosity of 10% or less between a porosity (%) of an upper layer portion corresponding to 20% of the thickness measured down from the surface of the electrode layer and a porosity (%) of a lower layer portion corresponding to 20% of the thickness measured up from the surface of the current collector based on the thickness of the electrode layer.

5. The method for manufacturing an electrode for an electrochemical device according to claim 1, wherein the electrode obtained from step (S50) has a porosity of 20%-70%.

6. An electrode for an electrochemical device manufactured according to the method of claim 1, which shows an absolute value of a difference in porosity of 10% or less between a porosity (%) of an upper layer portion corresponding to 20% of the thickness measured down from the surface of the electrode layer and a porosity (%) of a lower layer portion corresponding to 20% of the thickness measured up from the surface of the current collector based on the thickness of the electrode layer, and has a porosity of 20%-70%.

* * * * *